United States Patent Office 3,278,446
Patented Oct. 11, 1966

3,278,446
WASHING COMPOSITIONS
Riyad R. Irani, Florissant, Mo., assignor to Monsanto Company, a corporation of Delaware
No Drawing. Filed Oct. 9, 1962, Ser. No. 229,495
10 Claims. (Cl. 252—152)

This invention relates to methods and compositions for washing surfaces such as the surfaces of articles. More particularly this invention relates to the use of novel inhibiting agents in alkali cleansers and the resulting compositions which are especially suitable for washing articles such as glassware, metal, rubber and the like.

Such industries as the dairy and soft drink industries extensively use strongly alkaline solutions for washing bottles and glassware. Ordinary or tap water is customarily used with an alkaline cleanser to form the cleansing solution as well as for rinsing purposes. As is well known in using such a washing process a major problem is the precipitation under high alkaline conditions of the calcium and magnesium salts dissolved in the tap water. This problem manifests itself in such ways as depositing unsightly films on the articles being washed and interfering with the washing equipment, thus requiring frequent maintenance. The solution to this problem has usually been approached by the use of an inhibiting agent, that is, a material which holds the calcium and magnesium compounds in solution thereby preventing or minimizing their precipitation. However, inhibiting agents customarily employed such as polyphosphates, amino carboxylic acid derivatives and gluconates have limitations which sometimes seriously restrict their use. For example, the polyphosphates, e.g. sodium tripolyphosphate and tetra sodium pyrophosphate, are susceptible to hydrolysis or degradation wihch is primarily dependent on pH and temperature conditions. Certain amino carboxylic acid derivatives do not function effectively when used with an alkali cleanser. Gluconates do not effectively inhibit the precipitation of the calcium and magnesium compounds in the presence of such compounds as the soluble silicates and phosphates. As can be appreciated, therefore, an inhibiting agent which is "hydrolytically stable," functions effectively with alkali cleansers in the presence of compounds such as soluble silicates, phosphates and carbonates would represent an important advancement in the art.

Therefore, an object of this invention is to provide improved alkali cleanser compositions which are especially well suited for washing articles such as glassware, metal, rubber and the like.

Another object of this invention is to provide improved inhibiting agents for use in alkali cleansers which are especially well suited for washing articles such as glassware, metal, rubber and the like.

Other objects will become apparent from a reading of the detailed description and the claims.

It has been found that amino tri(lower alkylidenephosphonic acids), or the water soluble salts thereof, said acids being of the following formula:

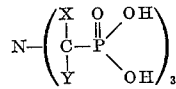

wherein X and Y represent hydrogen or a lower alkyl (1–4 carbon atoms), exhibit superior properties when used as an inhibiting agent as will be more fully discussed hereinafter.

Compounds illustrative of the invention are:

(1) amino tri(methylphosphonic acid)

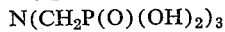
$N(CH_2P(O)(OH)_2)_3$ (2) amino tri(ethylidenephosphonic acid)

$N((CH_3)CHP(O)(OH)_2)_3$ (3) amino tri(isopropylidenephosphonic acid)

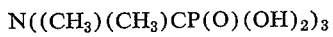
$N((CH_3)(CH_3)CP(O)(OH)_2)_3$

The amino tri(lower alkylidenephosphonic acids) and their salts may be prepared by various means, one of which comprises as a first step the preparation of the corresponding esters by reacting under reactive conditions ammonia, a compound containing a carbonyl group such as an aldehyde or ketone, and a dialkylphosphite. The free amino tri(lower alkylidenephosphonic acids) and their salts may be prepared by hydrolysis of the esters.

By the term "hydrolytically stable," as used herein, is meant a substantial resistance by the inhibiting agent to hydrolysis or degradation under various pH and temperature conditions. For example, a 20 gram sample of penta sodium amino tri(methylphosphonate),

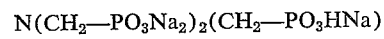
$N(CH_2-PO_3Na_2)_2(CH_2-PO_3HNa)$ was dissolved in 100 ml. of water. A 25 ml. portion of the solution was added to a 25 ml. portion of 12 M HCl to give a 10% solution of the inhibiting agent in HCl. Another 25 ml. portion of the solution was added to a 25 ml. portion of 10% NaOH to give a 10% solution of the inhibiting agent in a 5% solution of NaOH. The foregoing 10% solutions were boiled for a period of four hours, at the end of which both solutions exhibited no change in physical properties. Nuclear magnetic resonance spectra showed the two 10% solutions to be identical with fresh unheated 10% solutions of the inhibiting agent in water at the same acid and alkaline conditions, thereby establishing the resistance of the inhibiting agent to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of the anhydrous penta sodium amino tri(methylphosphonate), a dry powder, was heated on a thermogravimetric balance. Below a temperature of 300° C. less than 1% weight loss resulted. X-ray diffraction patterns of the heated sample and an unheated sample were identical. As is believed apparent from the foregoing, the inhibiting agent of the instant invention is "hydrolytically stable" and by functioning effectively in strongly alkaline washing solutions are extremely well suited for use in many and varied applications.

Generally stated, this invention relates to the use of amino tri(lower alkylidenephosphonic acids) and their salts as inhibiting agents in alkali cleansers and to the resulting compositions formed therefrom.

The alkali cleansers which may be used to practice the invention are inorganic compounds, such as the water-soluble compounds of the alkali metal and ammonium hydroxides (e.g., NaOH and KOH) and alkali metal and ammonium carbonates (e.g., $Na_2CO_3$), including mixtures thereof, which are suitable for washing articles in strongly alkaline solutions. Because of its availability and relative inexpensiveness sodium hydroxide (NaOH) is usually the major ingredient of most alkali cleansers and is, therefore, preferred.

It is to be understood that although the sodium salts of amino tri(lower alkylidenephosphonic acids) are preferred, and in particular the penta sodium salt, other alkali metal salts, such as potassium, lithium and the like, as well as mixtures of the alkali metal salts, may be substituted therefor. In addition, any water soluble salt, such as the ammonium salt (e.g.,

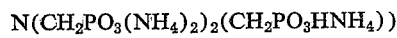
$N(CH_2PO_3(NH_4)_2)_2(CH_2PO_3HNH_4))$ and the amine salts, (e.g.,

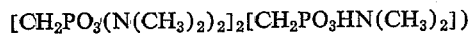
$[CH_2PO_3(N(CH_3)_2)_2]_2[CH_2PO_3HN(CH_3)_2])$ which exhibit the characteristics of the alkali metal salt may be used to practice the invention. Since the alkali cleanser compositions are used in strongly alkaline aqueous systems as will be more fully discussed hereinafter, the amino tri(lower alkylidenephosphonic acids) may be used by adjusting, if required, the cleanser composition or the resulting aqueous washing solution to the desired alkaline condition.

In forming the washing solution ordinary or tap water is suitable for use and customarily ranges between soft water having a hardness of about 50 p.p.m. (expressed as $CaCO_3$) and hard water having a hardness of about 350 p.p.m. (expressed as $CaCO_3$).

The amount of inhibiting agent necessary to be used with the alkali cleanser may vary depending upon, inter alia, the end use, type of alkali cleanser employed, type and amounts of water employed and the like. However, when used in a washing solution of soft water a cleanser composition having an inhibiting agent/alkali cleanser ratio by weight of between about 1/2 to 1/400 has been particularly effective. In hard water the amount of inhibiting agent is usually increased with an inhibiting agent/alkali cleanser ratio by weight of between about 5/1 to 1/40 being particularly effective. Therefore, when used in ordinary or tap water the proportions of the inhibiting agent to alkali cleansers necessary for best results may vary between about 5/1 to 1/400 and should preferably be adjusted within the foregoing ratio to find the optimum amount necessary.

Because the present invention is primarily directed to compositions for washing articles, such as bottles and glassware, the washing solution should preferably exhibit effective germicidal action as well as cleansing action without adversely affecting the articles. The effects of soaking time, alkaline concentration, and temperature are interrelated in the sense that increased temperatures and/or concentrations diminish the washing period required to attain a given standard of cleansing and germicidal performance. In general, the temperature ranges are usually taken to be about 120–165° F. and the concentration of the alkali cleansers in the alkaline washing solution are usually taken to be about 1–5% by weight; although as high as 20% alkali detergent may be employed under certain conditions. It should be noted, however, when using the free acid of the inhibiting agent and an alkali cleanser, such as sodium hydroxide, a certain amount of the sodium hydroxide which can readily be ascertained as necessary to neutralize the acid and is not, therefore, available for its intended function. The foregoing concentrations of alkali cleansers are intended to be those which are necessary for the germicidal and cleansing action and does not include the amounts necessary for neutralization of the acid.

The invention is not to be limited to any particular method of mixing the inhibiting agent. The inhibiting agent may be mechanically mixed in, crushed in the cleanser in the form of a slurry, or dissolved in a solution of the alkali cleanser. In addition, the inhibiting agent may be admixed with the alkali cleanser in any of the forms in which the alkali cleanser is manufactured in, as well as being added simultaneously or separately to an aqueous solution. In any event, the inhibiting agent is intended to be used with the alkali cleanser at the time of application as a cleansing agent.

To illustrate the invention, the following examples are presented.

Example 1

Into a conventional 3-necked, 3-liter flask fitted with a reflux condenser, stirrer and thermometer was added 600 grams of diethyl phosphite and 127.5 grams of 29% aqueous ammonia solution. The flask was placed in an ice bath and after the mixture had become cooled to about 0° C. 325 grams of 37% aqueous formaldehyde solution was added. The flask was removed from the ice bath and heated with the reaction occurring at about 100° C. After the reaction was completed the flask was allowed to cool to room temperature and the reaction products were extracted with benzene and separated by fractional distillation. Hexaethyl aminotri(methylphosphonate) distilled between 190°–200° C. at a pressure of .1 mm. and was obtained in a quantity of 184 grams. The following are the results to enable a comparison between the calculated percent constituents and found percent constituents:

Calculated: 36.78% C, 7.30% H, 3.53% N, 20.01% P.
Found: 38.54% C, 7.76% H, 3.00% N, 19.89% P.

The free acid, aminotri(methylphosphonic acid), $$N(CH_2P(O)(OH)_2)_3$$

was prepared by hydrolysis of a portion of the foregoing prepared ester. In a flask similar to that described above 40 grams of the ester was refluxed with about 200 ml. of concentrated hydrochloric acid for a period of about 24 hours. The free acid, a sirupy liquid, crystallized on prolonged standing (about 1 week) in a desiccator. The yield was 20 grams. The equivalent weight of the free acid, by titration, was found to be 62 as compared with the calculated value of 59.8.

Example 2

Penta sodium aminotri(methylphosphonate), $$N—(CH_2P(O)_3Na_2)_2(CH_2P(O)_3HNa)$$

was prepared by dissolving the free acid obtained in Example 1 in 140 ml. of 10% NaOH solution and evaporating the aqueous solution to dryness at about 140° C. with the anhydrous form of the salt being formed.

The following test was made in order to compare the effectiveness of an inhibiting agent of the instant invention with sodium gluconate, a widely used inhibiting agent in strongly alkaline washing solutions. In making the test 100 ml. solutions having a water hardness of 150 p.p.m. (Ca:Mg=3:2) and NaOH varying from .25% to 20% by weight were titrated with 35% aqueous solutions by weight of penta sodium aminotri(methylphosphonate), $N(CH_2PO_3Na_2)(CH_2PO_3HNa)$, and 40% aqueous solutions by weight of sodium gluconate to a clear endpoint which is an indication that the calcium and magnesium precipitates are dissolved into solution by the inhibiting agents. The results of the test are tabulated below:

TABLE 1

| NaOH (percent) | Inhibiting Agent in Solution for Clear Endpoint (percent) | |
|---|---|---|
| | A* | B* |
| 0.25 | .19 | .14 |
| 0.5 | .05 | .12 |
| 0.75 | .06 | .09 |
| 1.0 | .06 | .10 |
| 1.5 | .25 | .19 |
| 2.0 | .20 | .12 |
| 2.5 | .11 | .13 |
| 5.0 | .10 | .14 |
| 15.0 | .12 | .43 |
| 20.0 | .11 | .54 |

*A—penta sodium amino tri(methylphosphonate). B—sodium gluconate.

As can be observed from the above table the inhibiting agent of the present invention even in the absence of ingredients such as soluble silicates and the like is comparable to and in some instances better as an inhibiting agent in strongly alkaline washing solutions than sodium gluconate, a widely used inhibiting agent.

While an alkaline washing composition in accordance with this invention need contain only an alkali cleanser of the class described and an amino tri(lower alkylidenephosphonic acid) or a salt thereof, it will be appreciated that the incorporation in the mixture of additional ingredients commonly used in strongly alkaline wash solutions, such as anti-corrosive agents used to minimize the corrosive effect on glassware by strong alkali detergents (e.g., orthophosphates and silicates of soda) and the like, is contemplated as being within the invention. In this connection, it should be noted that the inhibiting agent of the instant invention has the important advantage of being effective in the presence of such additional ingredients. For example, a sample volume of .2% by weight of penta sodium amino tri(methylphosphonate), 3% by weight of NaOH, and water having a hardness of about 150 p.p.m. was mixed with an equal volume of 10% by weight of $Na_3SiO_3$ and water having a hardness about 150 p.p.m. Another sample volume identical to the foregoing one was mixed with an equal volume of 10% by weight of $NaCO_3$ and water having a hardness of about 150 p.p.m. In each instance there was no perceptible precipitate formed even after the solutions had been standing for 30 minutes. Also, a strongly alkaline solution containing the inhibiting agent of the present invention gave excellent results in washing articles, such as bottles and glassware.

As can be appreciated, therefore, the inhibiting agents of the present invention, which are hydrolytically stable and which function effectively in strongly alkaline washing solutions in the presence of compounds such as soluble silicates, carbonates and the like, are extremely well suited as inhibiting agents in many and varied applications.

What is claimed is:

1. An alkaline washing composition consisting essentially of a combination of an alkali cleanser and an inhibiting agent selected from the group consisting of amino tri(lower alkylidenephosphonic acids) having substituents on the carbon atom of the N—C—P linkages selected from the group consisting of hydrogen and alkyl groups containing from 1 to 4 carbon atoms, and their water soluble salts, the proportion by weight of said inhibiting agent to said alkali cleanser being between about 5/1 to 1/400.

2. The alkaline washing composition of claim 1 wherein said alkali cleanser is an alkali metal base selected from the class consisting of alkali metal hydroxides, alkali metal carbonates and mixtures of these.

3. The alkaline washing composition of claim 1 wherein said alkali cleanser is an alkali metal hydroxide.

4. A washing composition useful in making a strongly alkaline washing solution consisting essentially of a combination of an alkali cleanser and an inhibiting agent selected from the group consisting of amino tri(lower alkylidenephosphonic acids) having substituents on the carbon atom of the N—C—P linkages selected from the group consisting of hydrogen and alkyl groups containing from 1 to 4 carbon atoms, and their water soluble alkali metal salts, the proportion by weight of said inhibiting agent to said alkali cleanser being between about 5/1 to 1/400.

5. A washing composition useful in making a strongly alkaline washing solution consisting essentially of a combination of an alkali cleanser and, as an inhibiting agent, aminotri(methylphosphonic acid), said alkali cleanser and said inhibiting agent is present in the ratio by weight of between about 400/1 to 1/5.

6. A washing composition useful in making a strongly alkaline washing solution consisting essentially of a combination of an alkali cleanser and, as an inhibiting agent, penta sodium aminotri(methylphosphonate), said alkali cleanser and said inhibiting agent is present in the ratio by weight of between about 400/1 to 1/5.

7. A washing composition useful in making a strongly alkaline washing solution consisting essentially of a combination of sodium hydroxide and, as an inhibiting agent, amino tri(methylphosphonic acid), said sodium hydroxide and said inhibiting agent being present in the ratio by weight of between about 400/1 to 1/5.

8. A washing composition useful in making a strongly alkaline washing solution consisting essentially of a combination of sodium hydroxide and, as an inhibiting agent, penta sodium aminotri(methylphosphonate), said sodium hydroxide and said inhibiting agent being present in the ratio by weight of between about 400/1 to 1/5.

9. An alkaline washing solution consisting essentially of a combination of water, an alkali cleanser and an inhibiting agent selected from the group consisting of amino tri(lower alkylidenephosphonic acids) having substituents on the carbon atom of the N—C—P linkages selected from the group consisting of hydrogen and alkyl groups containing from 1 to 4 carbon atoms, and their water soluble salts, said alkali cleanser being present in a concentration of about 1 to 20% by weight of water and said inhibiting agent being present in the ratio by weight with said alkali cleanser of between 5/1 to 1/400.

10. The method of washing articles comprising applying thereto an aqueous solution comprising an alkali cleanser and an inhibiting agent selected from the group consisting of amino tri(lower alkylidenephosphonic acids) having substituents on the carbon atom of the N—C—P linkages selected from the group consisting of hydrogen and alkyl groups containing from 1 to 4 carbon atoms, and their water soluble salts, said alkali cleanser being present in a concentration of about 1 to 20% by weight of water and said inhibiting agent being present in the ratio by weight with said alkali cleanser of between about 5/1 to 1/400.

References Cited by the Examiner

UNITED STATES PATENTS

| 2,841,611 | 1/1958 | Bersworth | 260—500 |
| 2,976,248 | 3/1961 | Otrhalek | 252—156 |

OTHER REFERENCES

Petrov et al., "Synthesis of Amino Diphosphonates and Amino Tri Phosphonates," Chemical Abstracts, vol. 54 (1960), page 260.

LEON D. ROSDOL, *Primary Examiner.*

ALBERT T. MEYERS, JULIUS GREENWALD,
*Examiners.*

W. E. SCHULZ, *Assistant Examiner.*